Jan. 28, 1969  K. M. MAURER  3,424,401
METHOD AND MEANS FOR ATTITUDE CONTROL OF SPACE VEHICLES
Filed Oct. 18, 1966

INVENTOR
KENT M. MAURER

BY *Albert M. Zalkind*

ATTORNEY

United States Patent Office 3,424,401
Patented Jan. 28, 1969

3,424,401
METHOD AND MEANS FOR ATTITUDE CONTROL OF SPACE VEHICLES
Kent M. Maurer, 1726 17th St. NW.,
Washington, D.C. 20009
Filed Oct. 18, 1966, Ser. No. 591,389
U.S. Cl. 244—1
Int. Cl. B64g *1/00;* G01c *19/02*
13 Claims

ABSTRACT OF THE DISCLOSURE

A space vehicle is controlled about each of its major axes by mounting, along each axis, a pair of oppositely rotating masses interconnected by a motor driven differential mechanism and clutches, with a brake applicable to each mass. Application of the brake to one mass and disengagement of its clutch causes the speed of the other mass to increase because of the differential resulting in rotation of the vehicle. To avoid precessional effects, two pairs of oppositely driven masses are mounted on each major axis.

---

This invention relates to a method of control of the attitude of a space vehicle. In particular, it relates to control of the attitude of the vehicle while the vehicle is under zero gravity conditions or conditions of re-entry.

The principal object of this invention is to provide a reliable system of attitude control for a space vehicle under any conditions encountered by the vehicle during its normal operation.

Another object is to provide a reliable means of attitude control for a space vehicle.

It is a further object to provide means of attitude control utilizing simple counter-rotating masses.

It is a still further object to provide means for initially energizing and dynamically balancing the masses without causing any rotational effect upon the vehicle, i.e., attitude change.

It is an even further object to avoid or nullify the effect of precession which would ordinarily be caused by rotating masses on one axis while changing the attitude of the vehicle about another axis.

To accomplish this, the present invention applies the basic law of reaction by selectively rotating masses in opposite directions about an axis, by transferring kinetic energy between said masses, and by rotating the vehicle by reaction to the rotating masses. The invention provides means for energizing its control masses without affecting the vehicle, and means for cancelling out gyroscopic effects of precession inherent in any system utilizing a rotating mass.

The masses are identical wheels of predetermined weight driven by the respective side bevel gears of a differential gear mechanism, a reversing gear being used for one wheel so that the wheels rotate in opposite directions. A clutch is used to normally lock the output shafts of the differential for rotation in unison, each wheel having a brake for slowing it down or stopping it.

Thus, the three major axes of the vehicle have a pair of counter-rotating wheels, rotating on the respective axis.

The wheels may be continuously in motion prior to their use for attitude control, or they may be brought to a predetermined speed immediately prior to use. In either event, they are rotating under power with equal speed in opposite directions at the moment they are utilized to control the attitude of the vehicle. Energization and balancing of the rotation of the wheels is done in such a way as to preclude any effect on the vehicle during initial rotation of the wheels, which are in dynamic balance during normal rotation.

To turn the vehicle about a given axis the respective system is employed to brake one of the rotating wheels in relation to the vehicle. While the braking of one wheel is being effected, power is continuously applied to both wheels through the differential gear causing the rotation of the other wheel to increase to the same degree that the rotative speed of the first wheel is decreased. The effect is that, initially, momentum of the first wheel is transferred to the vehicle effecting a force thereon in the same rotational direction, and finally after braking has been completely effected the second drum is driven by the action of the differential, at twice the original speed with reference to the fixed axis A—A. Torque will be continually imparted to the vehicle as long as the system is energized and the brake engaged.

Accordingly, a dual force is effected for rotating the vehicle about the axis of rotation of the wheels, the reaction to braking of the one wheel and the reaction to initial speeding up of the other wheel and maintenance of its rotation.

To provide perfect balance for the space vehicle about each axis, and to counteract precession effects inherent in rotating systems, two systems as described above are coaxially provided for each major axis of the vehicle.

A detailed description of the invention now follows in conjunction with the appended drawing in which.

Figure 1:
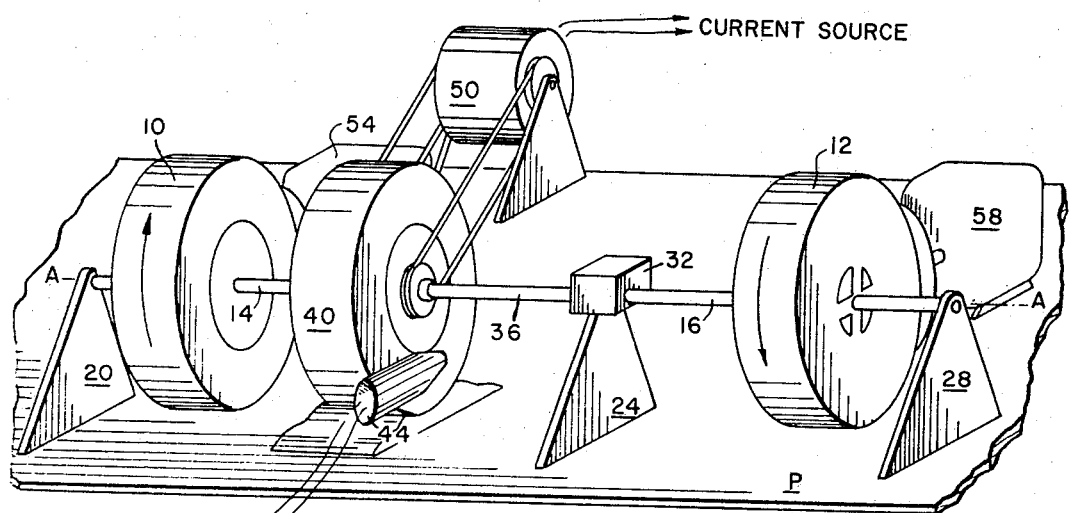
FIGURE 1 is a perspective view of a basic attitude control system or unit in accordance with the invention.

Referring to FIGURE 1, the reference character P will be understood to represent a platform of a space vehicle to be controlled and the axis A—A will indicate an axis of rotation of the vehicle, where rotation or attitude control of the vehicle is effected by the system shown mounted on the platform. The basic system illustrated comprises wheel masses 10 and 12 keyed on axles 14 and 16 supported on pedestals 20, 24 and 28. It will thus be understood that the wheels are rotated in opposite directions, as indicated by the arrows, and effected by a reverse gear mechanism 32 carried on pedestal 24 wherein an output shaft 36 from one side bevel gear of a differential gear mechanism 40 drives the reversing gear mechanism 32. The other side bevel gear of the differential drives shaft 14. The differential mechanism is mounted on the platform and the ring gear thereof driven in a suitable manner as by an electric motor 44 acting through hypoid gears on the ring gear of the differential, or for that matter a motor may be arranged to drive the ring gear by means of a spur pinion. The several parts mentioned of the differential gear are not illustrated and are not necessary for a proper understanding of the invention since any conventional differential gear mechanism may be utilized.

The shafts 14 and 16 may be coupled via pulleys and belting, as shown, through a clutch 50 so that in normal operation, when no orientation about axis A—A is desired, the wheels rotate in opposite direction at precisely the same speed. Preferably, clutch 50 is of an electromagnetic type so that a certain amount of slip is initially experienced when energized. Further, the use of belts would likewise provide a certain amount of slip. Alternatively, sprocket chains and sprocket wheels, or other conventional means could be used instead of belts wherein the desired slip could be provided by the use of a conventional slip differential and/or a dog clutch. An ordinary disc type friction clutch would also be usable since such a type provides a certain amount of initial slip. In any event, a certain amount of slippage is desired for reasons which will hereinafter be set forth.

Wheel 10 is controlled by a brake 54, preferably of an electromagnetic type and wheel 12 is controlled by a brake 58 of the same kind.

Thus, by effecting electromagnetic control of the clutch and brakes the pilot of the space vehicle can control the orienting system from a remote point, or it can be controlled by an automatically controlled programming system.

It will be noted that upon energization of motor 44, with the clutch engaged, both wheels start to rotate at the same time and with equally increasing speeds and since they are identical in mass and configuration, there will be no net reaction force exerted on the platform.

Assuming it is desired to orient a vehicle in the direction of the arrow on wheel 10, the brake 54 is applied and the clutch 50 is disengaged. Since the momentum of the wheel 10 is absorbed by the platform through the brake, there will be a rotational force about axis A—A. However, as wheel 10 slows down the side bevel gear of the differential, being keyed on the same shaft as the wheel, likewise slows down. Accordingly, by the well-known action of a differential mechanism, the other side bevel gear will speed up whereby the wheel 12 will speed up. Accordingly, the rotational force causing the speed up of wheel 12 will act in a direction opposite to the direction of rotation of wheel 12, thus effecting a reaction force tending to further rotate the vehicle about axis A—A. Actually, if wheel 10 is stopped entirely, the wheel 12 has taken on twice its normal speed in accordance with the well-known principle of differential gear mechanism. It will be apparent that the rotation of wheel 12 is no longer balanced by reaction of wheel 10 and, therefore, the platform will rotate about axis A—A as long as the condition is maintained, such rotation being in a direction opposite to the arrow shown on wheel 12.

Since it is normally not desired to maintain continuous rotation of the vehicle, such action is stopped when the desired orientation is reached by merely releasing the brake 54 and engaging the clutch 50. At this point clutch slippage is desirable to prevent the tremendous shock of suddenly accelerating wheel 10 from the standstill position, and as heretofore mentioned, various slip arrangements may be utilized for this purpose. After initially starting up wheel 10 the torque transmission slippage ceases and both wheels are brought up to the same speed in a dynamically balanced manner, one wheel speed increasing with the other decreasing, until full stabilization on the axis A—A is maintained.

In order to orient the platform around axis A—A in the direction of the arrow on wheel 12, that wheel is braked by brake 58 and clutch 50 disengaged. Thereafter, the same action ensues as described above for rotating the vehicle, and for stopping the rotation of the vehicle.

In summation of the above it will be apparent that the kinetic energy of either wheel is transferred to the vehicle in slowing that wheel for the purpose of rotating the vehicle, with the dual rotational effect produced by the speeding up of the other wheel.

Further, the vehicle is maintained in dynamic balance when the wheels are initially brought up to speed from a standstill position and, therefore, it is not necessary to maintain both wheels in rotation continuously. The wheels can be stationary and when it is desired to rotate the vehicle about the axis of the wheels, the motor 44 is energized, bringing the wheels up to a predetermined speed whence subsequent braking of either wheel will produce the respective direction of vehicle rotation.

It will, of course, be understood that the three major axes of a space vehicle are provided with a system as shown in FIGURE 1. However, in order to avoid precessional effects due to the gyroscopic action which would occur when the wheels of an axis other than the axis A—A are bodily rotated, due to rotation of the vehicle around axis A—A, it is preferable to provide two identical systems (of which only one is in FIGURE 1) for each of the major axes of the vehicle, as will be later described.

In order to avoid such precessional effect in a basic arrangement as shown in FIG. 1 comprising a single pair of rotating masses on each major axis of a vehicle, the masses would be maintained normally stationary. When it is desired to rotate the vehicle on any axis, the masses on that axis would be put into rotation and thereafter selectively braked depending upon direction of rotation required, all as set forth hereinabove.

It is expected that the mass of the ring gear and pinions (not shown) of the differential mechanism would be negligible as compared with the masses of the respective rotating wheels. Accordingly, a small correction torque could readily be introduced by programming or by a gyroscopic stabilizing system which would introduce compensating control. Another arrangement would be to provide a counter-rotating mass to effect ring gear and pinion mass, driven by a counter-rotating but identical motor 44. Accordingly, any unbalanced reaction would be provided with an opposite reaction to neutralize it.

Figure 2:
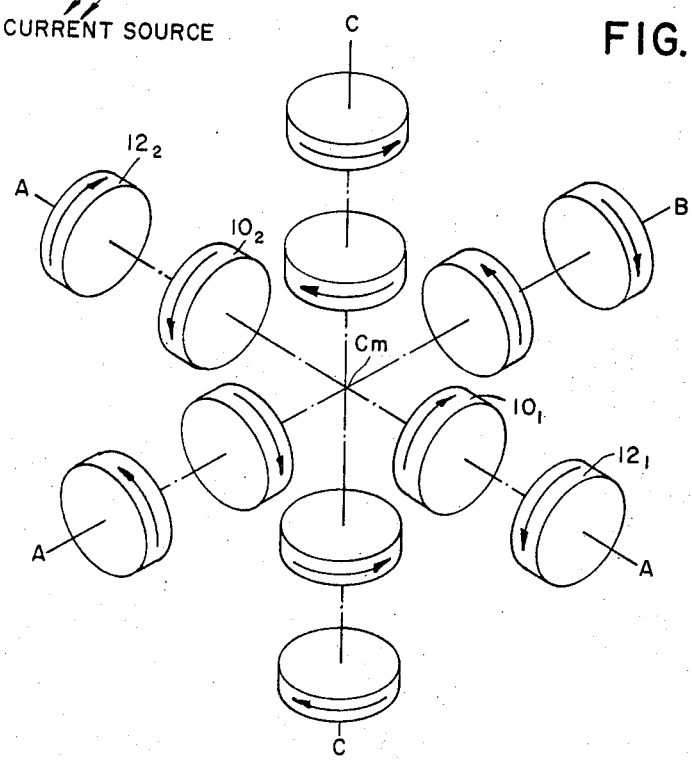
FIGURE 2 is a diagrammatic sketch showing six basic control units arranged about the center of mass of the space vehicle.

A preferably arrangement for avoiding precessional effects as well as augmenting rotational control would be to provide two systems per axis, as symbolically indicated in FIG. 2. Thus, in FIG. 2 the three major axes of a space vehicle are indicated as A—A, B—B and C—C. These axes intersect at $C_m$, the center of mass of the vehicle, and disposed on each side of $C_m$, on a respective axis, is a pair of counter-rotating wheels, all wheels being of the same mass for the sake of simplicity and normally rotating at the same speed. The differential, clutch, and brake mechanisms have been eliminated for clarity and simplicity in FIG. 2. It will be noted with reference to axis A—A that the wheels $10_1$ and the wheel $10_2$ are equidistant from and closer to $C_m$ than the other wheels on that axis, namely, $12_1$ and $12_2$. Also it will be noted that $10_1$ rotates in a direction opposite to the direction of rotation of $10_2$; similarly $12_1$ rotates in a direction opposite to that of wheel $12_2$. In a similar manner, it will be seen that the same dual pair wheel arrangement is carried out for axis B—B and axis C—C, all wheels being identical on the three axes and all axis wheel systems being identical in wheel spacing, rotation direction, control arrangement, etc. Preferably, all wheels are the same mass and rotate at the same speed but this is not essential just so long as all wheels on any one axis have the same momentum and are simultaneously controlled for effecting rotation on that axis. In an arrangement thus providing dual systems on each axis all wheels are in continuous rotation without danger of precession effects for the reason that the precession effects are continually canceled out. Thus, the precession effect of wheels $10_1$ and $12_1$ due to rotation of the vehicle on either of the other axes is balanced by the opposing precession effects of counter-rotating wheels $10_2$ and $12_2$ and vice versa, for either directions of precession. Obviously, the wheels on any axis have compensatory precession for the other two axes. This result is produced by providing equal momentum of the rotating systems on each axes and equalizing the torque of precession forces around $C_m$. Thus, $10_1$ and $10_2$ are at the same distance from $C_m$, the same equalization of mechanical advantage being had for wheels $12_1$ and $12_2$ likewise at the same distance from $C_m$. Since the dual systems have wheels with the same leverage, i.e., equal mechanical advantage with respect to $C_m$ any precession effects on an axis is balanced out. In other words, if a rotational effect on axis A—A is produced by deliberate control, there would be gyroscopic action of precession forces on axes B—B and C—C due to the rotating masses on those axes. However, in each instance, such force would be balanced by the counter-rotating pairs of wheels on each such axis.

Although all wheels may be of identical design, it will, of course, be understood that where a heavier dynamic mass is needed on any particular axis due to the mass distribution of the vehicle, heavier wheels would be used for such axis.

Another method of attitude control for causing the vehicle to rotate about an axis parallel to the axis of rotation of the rotary masses or on the axis of rotation is as follows, assuming that counterclockwise correction in the direction of the arrow on wheel 12 is desired:

(1) Engage brake 58,
(2) Energize motor 44.

To deactivate the control unit after the desired correction has been effected:

(3) Disengage brake 58,
(4) Deenergize motor 44,
(5) Engage clutch 50,
(6) Simultaneously engage brakes 54 and 58 after the clutch 50 has been fully engaged.

It should be understood that both brakes 54 and 58 and clutch 50 are normally disengaged, the motor 44 being normally deenergized and the wheels not rotating. The effect of step 1 is to hold the wheel 12 stationary while permitting motor operated rotation of wheel 10 upon effecting step 2. The reaction of the vehicle will then be a rotation in the direction opposite to the rotation of wheel 10 in accordance with well understood principles. The braking of wheel 12 holds the respective differential bevel gear stationary so that wheel 10 may be power-rotated.

In deactivation the disengagement of brake 58 releases wheel 12 which, upon engagement of clutch 50, is directly coupled to the rotating wheel 10 and, therefore, causes that wheel to slow down, the motor being deenergized so that the kinetic energy is absorbed by the wheel 12 rather than the vehicle whereby no orientation of the vehicle is effected by virtue of slowing down of wheel 10 and consequent speeding up of wheel 12. The wheels are, of course, rotating in opposite directions due to the reversing mechanism 32. Theoretically, it would be possible to permit the wheels to lose all their energy by virtue of friction, but in order to maintain the system ready for instant use the brakes 54 and 58 are used to stop the wheels. The shock of transferring rotational energy from wheel 10 to wheel 12 is absorbed to some extent by clutch 50 when it is engaged.

The same procedure is followed for controlling the vehicle for corrective rotation in the direction of the arrow of wheel 10 except that brake 54 is used in step one (1) instead of brake 58.

It will of course, be understood that each axis of the vehicle has systems involving the wheel pairs of FIG. 2, all of which systems can be operated in accordance with the preceding procedure.

Figure 3:
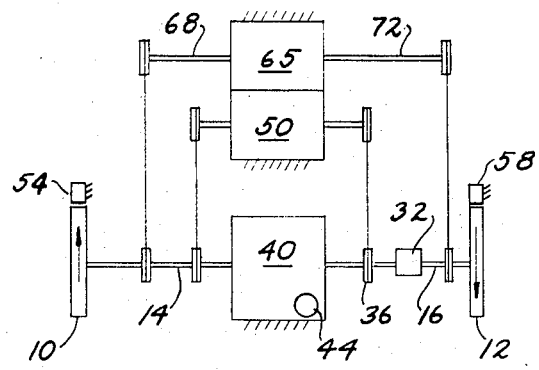
FIGURE 3 is a modified arrangement of the device of FIGURE 1.

A still further method of control, and one which is preferred, involves a modified arrangement as shown in FIG. 3 wherein the same arrangement as seen in FIG. 1 is duplicated, corresponding parts having the same reference numerals as found in FIG. 1.

In FIG. 3 there has been added a clutch 65 of the same kind as clutch 50 having a shaft 68 driven by shaft 14 and a shaft 72 driven by shaft 16 on the output side of the reversing mechanism 32. Positive drive connection with the clutches is preferred.

Figure 4:
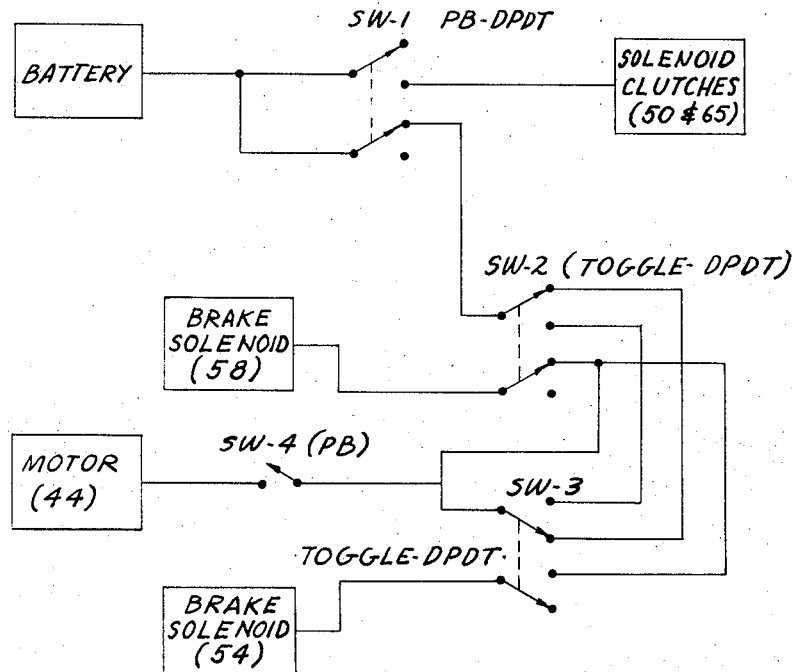
FIGURE 4 is a schematic electrical diagram for the control of FIGURE 3.

FIG. 4 shows a schematic electrical diagram for the control of the arrangement shown in FIG. 3. Thus, in FIG. 4 there is illustrated a battery for energizing the circuit and various switches SW1, SW2, SW3, and SW4. The switches SW1 and SW4 are push button type whereas switches SW2 and SW3 are toggle type. The motor, brakes, and clutches are illustrated as blocks.

When it is desired to correct the vehicle attitude on an axis which is the same as or parallel to the axis of the wheels shown in FIG. 3, assuming correction is desired in the direction of the arrow on wheel 12, the following steps are followed:

(1) Momentarily close SW1 to effect engagement of the clutches thereby insuring against any rotational motion of the wheels. Thus, the clutches will lock the wheels against rotation since they are coupled through the reversing mechanism 32 to the differential 40.

(2) Release SW1 and engage the brake 58 by shifting the switch SW2 to hold wheel 12 stationary.

(3) Energize the motor by pressing switch SW4, holding the motor energized until the desired correction is effected.

The wheel 10 will accordingly be rotated clockwise in the direction of the arrow thereon shown in FIG. 3 causing counter-clockwise correction, that is, in the direction of the arrow on wheel 12. After correction has been made and the switch SW4 released to deenergize the motor, the switch SW2 is then shifted to effect disengagement of brake 58 and switch SW1 is again momentarily pressed to bring the wheels to a complete stop.

For an attitude correction in the opposite rotational direction the same sequence steps are followed except that in such instance the brake 54 is energized by means of the switch SW3 which happens to be shown in the position for such clockwise correction in FIG. 4. Momentary pressing of switch SW4 will then cause rotation of wheel 12 in the direction of the arrow thereon whence correction in the opposite direction is effected.

It will, of course, be understood that the system for each axis of a vehicle is provided with a control arrangement as shown in FIGS. 3 and 4 for manual control and that computer program control could also be utilized as well as any suitable automatic system.

It will be noted that the diagram wiring of FIG. 4 prohibits energization of both brakes at the same time although permitting energization of either brake and the motor at any one time. Accordingly, the locked condition of the wheels is brought about by simultaneous energization of the clutches without producing any reaction effect on the vehicle.

The particular advantage of the arrangement of FIG. 3 over that shown in FIG. 1 is the fact that both wheels are brought to a substantial positive stop at the end of a correcting function, therefore readying the system very quickly for further use on another axis and avoiding precessional effects. Theoretically, the system of FIG. 1 can have the same effect insofar as quick and precision control is concerned but as a practical matter, the locking effect via the clutch 65 is preferable to reliance on brakes for virtually instant stopping.

For purposes of claim terminology it will be understood that the term "output sides" refers to the side bevel gears of a conventional differential mechanism of the automotive type having planet pinions carried by the usual input gear that is connected to motor 44 for power input rotation. The construction of the differential mechanism is so common as not to require illustration and for convenience in explaining the invention such type of differential mechanism is described. However, it will be understood that the invention is not limited to that specific type of differential mechanism but equivalent mechanical or electronic arrangements, etc., are usable so long as they perform the functions in the combinations described hereinabove.

What is claimed is:

1. A method of attitude control about an axis of a space vehicle with respect to a fixed frame of reference which comprises rotating two masses in opposite directions with respect to said fixed frame to reference around said axis, and simultaneously retarding, by reaction against said vehicle, the rotational speed of one mass with respect to said fixed frame of reference while increasing, by reaction against said vehicle, the rotational speed of the other mass with respect to said fixed frame of reference.

2. A method as set forth in claim 1, including the prior step of energizing said masses simultaneously from a stationary condition and increasing their speed equally up to a predetermined operational speed while said vehicle is in space.

3. A method as set forth in claim 1, wherein increasing the speed of the other mass is effected upon decreasing the speed of said other mass by coupling said masses through a differential mechanism.

4. A method as set forth in claim 1, wherein said masses are of equal moment of inertia and initially rotated at the same speed.

5. An attitude control system for an axis of a space vehicle comprising a pair of masses mounted for coaxial rotation, means for rotating said masses with equal angular momentum in opposite directions with respect to a fixed frame of reference, and control means for retarding the angular momentum of one of said masses with respect to said fixed frame of reference while increasing the angular momentum of the other with respect to said fixed frame of reference, thereby changing the angular momentum of said space vehicle with respect to said fixed frame of reference.

6. A unit as set forth in claim 5, said means for rotating said masses comprising a differential mechanism having a pair of output elements connected to rotate respective masses, and said control means comprising means for locking said differential mechanism in normal operation and for unlocking said differential mechanism for attitude control effect, and including respective brake means for said masses.

7. An attitude control system as set forth in claim 5, including an additional system comprising a pair of oppositely rotating masses coaxial with said first-mentioned pair and showing a rotating means and a means, whereby a dual system is effected so that one mass of each system may be disposed on a respective side of the center of mass of a space vehicle and the other mass of each said system also disposed on respective sides of said center of mass.

8. An attitude control system as set forth in claim 7, comprising three such dual systems arranged on respective axes at right angles to each other.

9. A method of attitude control of a space vehicle with respect to a fixed frame of reference which comprises providing two rotating systems on each of a plurality of angularly related axes, each system having a pair of oppositely rotating masses and each system being on a respective side of the center of mass of said vehicle, decreasing with respect to said fixed frame of reference the momentum of the masses which rotate in one direction on an axis while increasing with respect to said fixed frame of reference the momentum of the masses on that axis which rotate in the opposite direction so that said increase and decrease of momentum is effected by reaction against said vehicle, while maintaining momentum of the masses on any other axis.

10. A momentum transfer system of attitude control comprising a pair of rotational masses, a differential mechanism, said masses being connected to opposite output sides of said differential mechanism, a motor for effecting input power rotation of said differential mechanism, a reversing mechanism, one mass being connected through said reversing mechanism to the respective side of said differential mechanism, a respective brake means for each mass, and clutch means connected to said masses for transmitting torque effect therebetween.

11. A system as set forth in claim 10, wherein said clutch means comprises a clutch connected directly to one output side of said reversing mechanism and to the other output side through said reversing mechanism.

12. A system as set forth in claim 11, wherein said clutch means comprises another clutch connected directly to the output sides of said reversing mechanism.

13. A system as set forth in claim 12, including means for effecting simultaneous engagement and disengagement of said clutches.

References Cited

UNITED STATES PATENTS

| 2,734,383 | 2/1956 | Paine | 244—79 X |
| 3,153,353 | 10/1964 | Voigt | 74—5.22 X |
| 3,329,375 | 7/1967 | Kurzhals et al. | 244—1 |
| 3,336,819 | 8/1967 | Jones | 74—757 X |

FERGUS S. MIDDLETON, *Primary Examiner.*

U.S. Cl. X.R.

74—5.34